United States Patent [19]
Seo

[11] Patent Number: 6,160,776
[45] Date of Patent: Dec. 12, 2000

[54] OPTICAL RECORDING MEDIUM, AND METHOD OF MANUFACTURING OPTICAL RECORDING MEDIUM

[75] Inventor: Katsuhiro Seo, Kanagawa, Japan

[73] Assignee: Sony Corporation, Tokyo, Japan

[21] Appl. No.: 09/122,154

[22] Filed: Jul. 24, 1998

[30] Foreign Application Priority Data

Jul. 24, 1997 [JP] Japan ................................ 9-198301

[51] Int. Cl.[7] ............................................. G11B 5/09
[52] U.S. Cl. ................................. 369/47; 369/275.4
[58] Field of Search .................... 369/32, 33, 47, 369/48, 49, 50, 54, 58, 124.04, 275.3, 275.4

[56] References Cited

U.S. PATENT DOCUMENTS

| | | | |
|---|---|---|---|
| 5,930,228 | 7/1999 | Miyamoto et al. | 369/275.4 |
| 5,933,411 | 8/1999 | Inui et al. | 369/275.4 |
| 5,943,313 | 8/1999 | Ando et al. | 369/275.4 |

FOREIGN PATENT DOCUMENTS

| | | | |
|---|---|---|---|
| 0 326 437 A2 | 8/1989 | European Pat. Off. | G11B 7/00 |
| 0 347 858 A2 | 12/1989 | European Pat. Off. | G11B 27/30 |
| 0 473 305 A1 | 3/1992 | European Pat. Off. | G11B 7/00 |

*Primary Examiner*—Paul W. Huber
*Attorney, Agent, or Firm*—Limbach & Limbach LLP

[57] ABSTRACT

Accurate detection of a clock synchronization mark represented by wobbles of a track is realized. A track is wobbled by a synchronization mark signal which has a waveform such that the differential value near the leading portion and the trailing portion of the waveform is a value smaller than that of a rectangular wave, thereby wobbled portions corresponding to synchronization marks are formed. For example, a synchronization mark signal is a signal of a waveform such that both end portions of the waveform are almost linear, in which level variations are moderate, and the center of the waveform has sharp level variations.

6 Claims, 9 Drawing Sheets

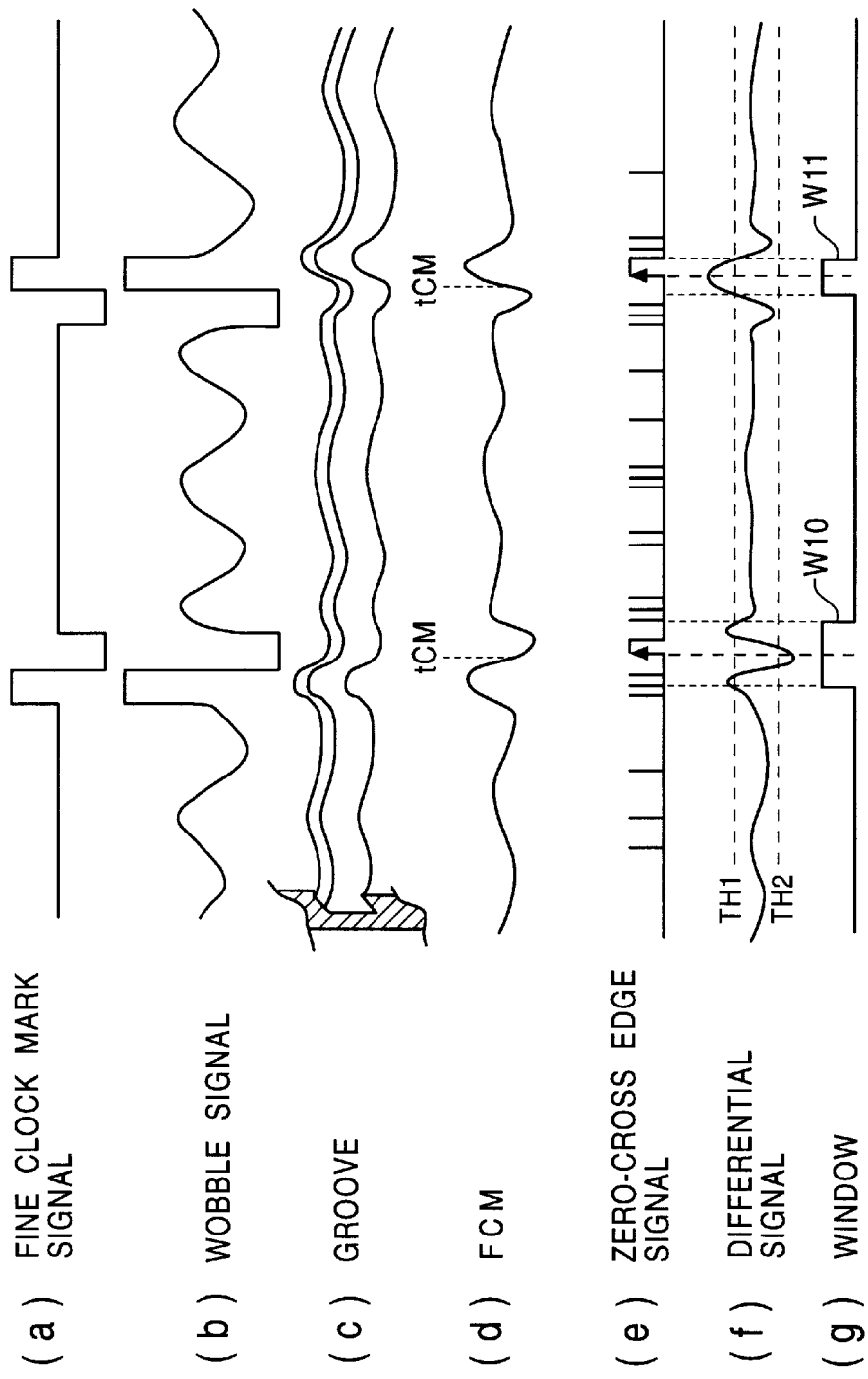

OPTICAL RECORDING MEDIUM, AND METHOD OF MANUFACTURING OPTICAL RECORDING MEDIUM

BACKGROUND OF THE INVENTION

1. Field of the Invention

The present invention relates to an optical recording medium, such as an optical disk, and a method of manufacturing the same, and more particularly, to an optical recording medium in which address information is recorded by wobbling pregrooves.

2. Description of the Related Art

In order to record data onto a disk, address information must be recorded so that data can be recorded at predetermined positions. In one such case, this address information is recorded by wobbling.

That is, a track for recording data is formed in advance, for example, as a pregroove. The side wall of this pregroove is wobbled (meandered) in accordance with address information.

When this is done, an address can be read from the wobbling information. Even if, for example, pit data and the like indicating an address is not formed on a track in advance, it is possible to record and reproduce data at a desired position.

FIGS. 1A and 1B show an example of the structure of a groove of an optical disk. As shown in FIG. 1A, the track on the disk 100 is formed as a pregroove 101 in advance in a spiral shape from the inner region toward the outer region.

At parts of this pregroove 101, as shown in exploded view in FIG. 1B, the side walls on the right and left are wobbled in accordance with address information. That is, they are meandered at predetermined cycles in accordance with a wobbling signal generated on the basis of the address. Between the pregroove 101 and a pregroove 101 adjacent thereto is a land 102, and, for example, recording of data is performed in the pregroove 101.

In such a wobbled pregroove 101, for example, not only address information, but also information as a fine clock mark used for clock synchronization can be contained.

As wobbled grooves, by disposing wobbled portions in accordance with this fine clock mark at predetermined intervals, the reproduced information can be, for example, fine radius position information in one circular track on the disk.

An operation for generating a fine clock mark and detecting the fine clock mark will now be described with reference to FIG. 2.

In a step for manufacturing a disk (forming tracks by wobbled pregrooves), a fine clock mark signal of a rectangular wave having a high frequency as in FIG. 2(a) is generated at predetermined intervals, for example, as absolute address data.

This is synthesized with a signal such that an absolute address is modulated by a predetermined carrier, generating a wobble signal such as that of FIG. 2(b).

In an operation for cutting a master disk, by deflecting a laser beam for exposure in accordance with a wobble signal, the exposure track is wobbled. In the disk manufactured from such a master disk, a wobbled groove which meanders in accordance with an address and a fine clock mark as in FIG. 2(c) is formed.

In a recording and reproduction apparatus, when a laser spot LS is radiated onto a track (groove 101) as in FIG. 1B, of the groove reproduced information obtained as reflected light therefrom, a signal FCM for use in fine clock mark detection is as shown in FIG. 2(d). In an operation for detecting a fine clock mark, by detecting the zero-cross edge of the signal FCM, a timing tCM is made to be a fine clock mark timing.

However, the groove is made to meander in its entirety. Therefore, since a zero-cross edge is detected at other than the timing tCM as in FIG. 2(e), a window is generated to mask an unwanted zero-cross edge.

In order to generate a window, a signal FCM is differentiated to obtain a differential signal of FIG. 2(f), and this is sliced by predetermined threshold values TH1 and TH2. That is, to form a window for taking out only the section (section in which the timing tCM is the center) in which there are sharp amplitude variations as a fine clock mark, the threshold values TH1 and TH2 are generated, and a window such as that in FIG. 2(g) is generated.

Here, in the example of FIG. 2(g), an example is shown in which a window is correctly generated for a window W11. That is, as can be seen from a comparison with the zero-cross edge signal of FIG. 2(e), the window W11 is a window such that only the zero-cross edge at timing tCM can be extracted.

However, since the differential value becomes high even at the leading portion and the trailing portion of the amplitude as a fine clock mark, some degree of amplitude of the differential signal appears even at the leading portion and the trailing portion thereof as in FIG. 2(f).

Since the amplitude of a window W10 at the leading portion and the trailing portion thereof exceeds the threshold value TH1, it has a wider window width than is required.

In this case, when the zero-cross edge signal is extracted in the window W10, zero-cross edge detection is performed at other than the original fine clock timing tCM, presenting the problem that a fine clock mark timing cannot be detected accurately.

That is, for a signal FCM obtained in response to a fine clock mark, a large amplitude is produced at other than the original fine clock mark timing as a differential signal thereof, and as a result, a window cannot be generated correctly, and the accuracy of detection of a fine clock mark timing is a problem.

SUMMARY OF THE INVENTION

In view of such a problem, an object of the present invention is to cause an operation for detecting a synchronization mark, such as the above-described fine clock mark, to be performed accurately.

To achieve the above-described object, according to one aspect of the present invention, there is provided an optical recording medium in which a track for recording data is formed in advance, this track being wobbled in accordance with an address modulation signal such that a carrier having a predetermined frequency is frequency-modulated in such a manner as to accord with address information, wherein the address information contains a plurality of synchronization marks, and the synchronization marks are recorded in such a way that the track is wobbled in accordance with a synchronization mark signal which has a frequency higher than that of the address modulation signal, and which has a waveform whose differential value near the leading portion and the trailing portion of the waveform is a value smaller than that of a rectangular wave.

The address information may be such that synchronization marks are placed at predetermined intervals, wobbled portions of the synchronization marks being placed so as to have predetermined distance intervals or predetermined angular intervals on a track wobbled in accordance with the address modulation signal.

The wobbled portion of the synchronization mark is preferably formed into a wobbled shape such that the differential value of the information reproduced from the wobbled portion increases in the center of the wobbled portion and decreases sufficiently in a portion other than the center of the wobbled portion.

As a result, a window can be generated satisfactorily from the differential signal during recording and reproduction, and synchronization mark detection can be performed accurately.

According to another aspect of the present invention, there is provided a method for manufacturing an optical recording medium in which a track for recording data is formed in advance, the method comprising the steps of: generating an address modulation signal such that a carrier having a predetermined frequency is frequency-modulated in accordance with address information; generating a synchronization mark signal which accords with a plurality of synchronization marks contained in the address information, which has a frequency higher than that of the address modulation signal, and which has a waveform whose differential value near the leading portion and the trailing portion of the waveform is a value smaller than that of a rectangular wave; generating a wobbling signal by synthesizing the address modulation signal with the synchronization mark signal; and forming a wobbled track in accordance with the wobbling signal.

The synchronization mark signal is preferably a signal having a waveform such that both ends of the waveform are almost linear, in which level variations are moderate, and the center of the waveform has sharp level variations.

In the formation step, laser light from a laser light-source unit is preferably radiated onto a photoresist surface of a substrate while the laser light is being deflected.

The above and further objects, aspects and novel features of the invention will become more apparent from the following detailed description when read in connection with the accompanying drawings.

BRIEF DESCRIPTION OF THE DRAWINGS

FIG. 2 is an illustration of a conventional fine clock mark production and detection operation.

DESCRIPTION OF THE PREFERRED EMBODIMENT

Figure 1A:
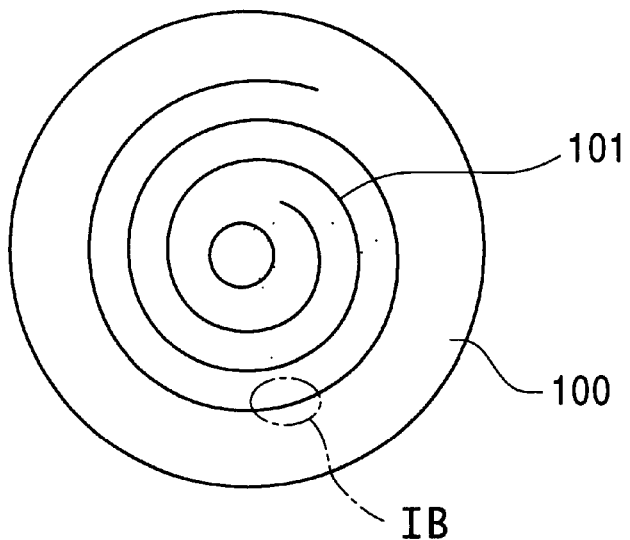
FIGS. 1A and 1B are illustrations of a wobbled pregoove of a disk.
Figure 1B:
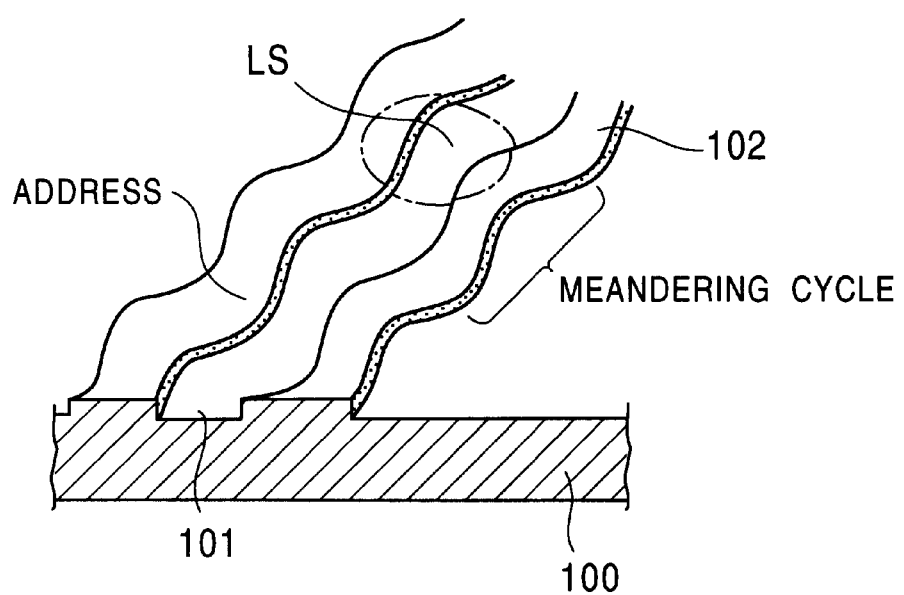

In an embodiment of the present invention, a recordable optical disk, and a cutting apparatus which is adapted for the optical disk will be described below in the following sequence.

1. Wobble address format of an optical disk
2. Cutting apparatus and disk to be formed
3. Recording and reproduction apparatus
4. Fine clock mark detection operation 1. Wobble address format of an optical disk An optical disk of this example is an optical disk for recording data by a phase-change method, and as the disk size thereof, the diameter is set at 120 mm. Also, it is a disk such that two plates having a disk thickness (substrate) of 0.6 mm are laminated, and the disk thickness is 1.2 mm as a whole.

A track by a groove is formed in advance on the disk, and as a result of the wobbling (meandering) of this groove, physical addresses are represented. Since the groove is wobbled in accordance with a signal such that the address is FM-modulated, an absolute address can be extracted by FM-demodulating information reproduced from the groove. Also, the disk is rotationally driven by a CAV (constant angular velocity), and in response to this, the absolute address contained in the groove becomes CAV data.

The depth of the groove is a laser wavelength $\lambda/8$ for recording and reproduction, the groove width is 0.48 $\mu$m, and the wobbling amplitude is 12.5 nm.

The laser wavelength is set at $\lambda$=650 nm (−5/+15 nm), and the numerical aperture NA of the optical head (objective lens) of the recording and reproduction apparatus is set at 0.6.

In this optical disk, a groove recording method is adopted (lands are not used for recording), and from the center of the groove to the center of the adjacent groove along the track width direction is a track pitch. The track pitch is 0.80 $\mu$m.

Also, data is recorded at CLD (constant linear density). The line density is 0.35 $\mu$m/bit.

However, as a linear density range, a particular width is set, and in practice, a very large number of zones are set, causing the entire disk to be close to a constant linear density. This is called a zoned CLD (constant linear density).

Since a data recordable area in a disk having a diameter of 120 mm is set and zoned CLD is used, the track pitch 0.80 $\mu$m is a value which realizes a recording capacity of 3.0 gigabytes per one surface (one of the recording layers).

In the disk of this example, control information, such as control data, is recorded as read-only data as an embossed area, for example, in the innermost region and the outermost region. Other than the embossed area is a recordable and reproducible groove area. In this groove area, a track is formed in advance by a wobbled groove, and the wobbled groove represents an absolute address. Therefore, the recording and reproduction apparatus is capable of obtaining information, such as an absolute address, by extracting a signal in response to a groove wobbled situation during the disk driving.

In an example of the groove structure of the optical disk of this example, similarly to the example described with reference to FIG. 1A, a pregroove is formed in advance in a spiral shape from the inner region toward the outer region. The pregroove can also be formed concentrically.

One track (one circular track) of the disk has a plurality of wobbling address frames.

Figure 3:
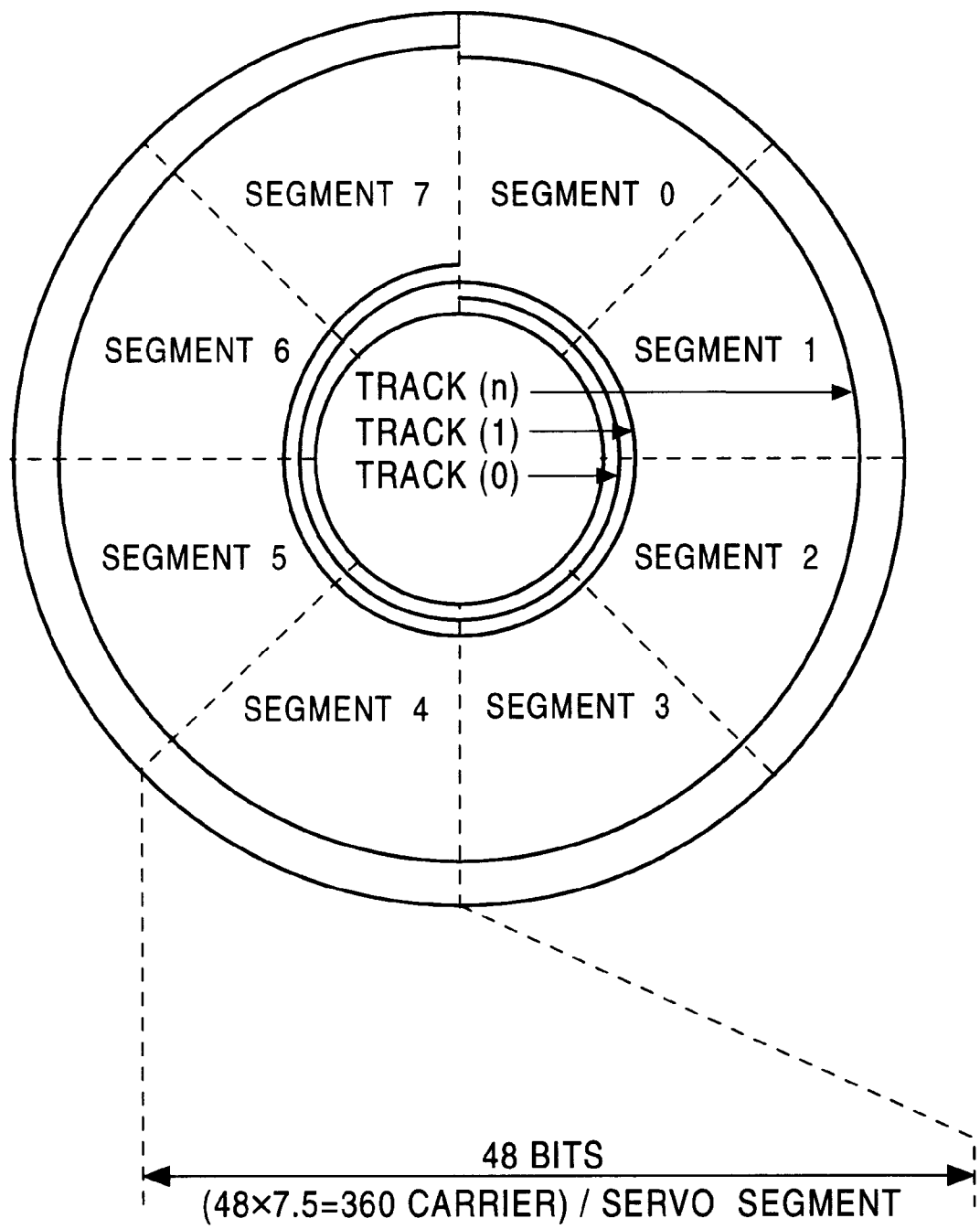
FIG. 3 is an illustration of a CAV format of a wobbling address of a disk according to the embodiment.

The wobbling address frame is divided into eight portions in the direction of the rotation of the disk, as shown in FIG. 3, each being a servo segment (segment 0 to segment 7).

Contained in one servo segment (hereinafter referred to simply as a segment) is 48-bit information having mainly an absolute address, and wobbling per segment is 360 waves.

In each wobbling address frame as each segment (segment 0 to segment 7), 48-bit wobble data is FM-modulated and a wobbled groove is formed.

Also, fine clock marks (FCKs) are formed at even intervals in the wobbled groove, and these are used to generate a reference clock during data recording by a PLL circuit. For each rotation of the disk, 96 fine clock marks are formed. Therefore, 12 fine clock marks are formed per segment.

Figure 4:
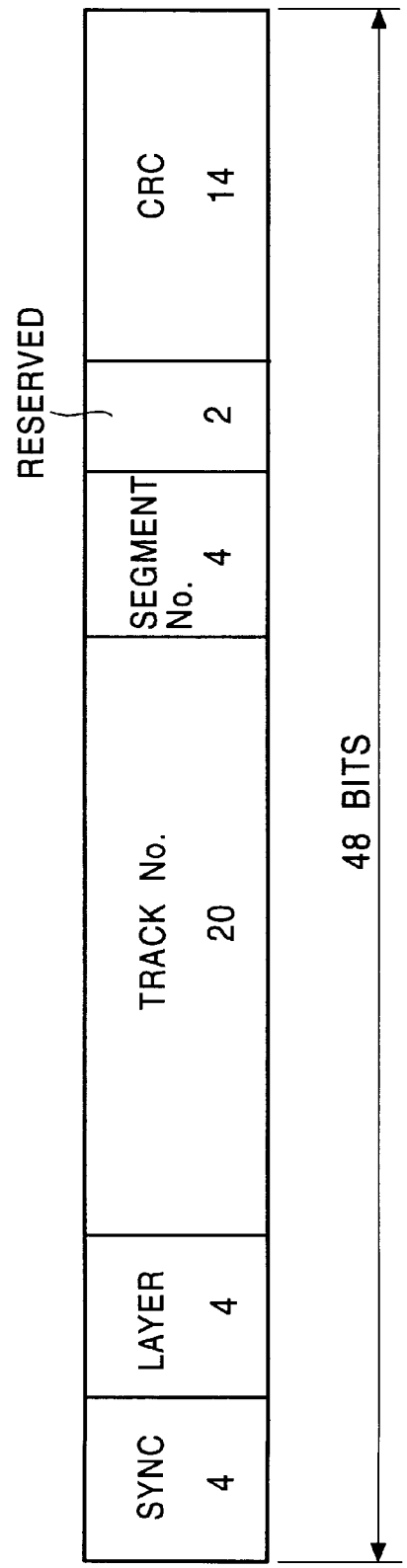
FIG. 4 is an illustration of the frame structure of a wobbling address of a disk according to the embodiment.

Each wobbling address frame in each segment (segment 0 to segment 7) is structured as shown in FIG. 4.

In the 48-bit wobbling address frame, the first four bits are a synchronization signal (Sync) indicating the start of the wobbling address frame. This 4-bit synchronization pattern is biphase data which forms 4-bit data by 8-channel bits.

The next four bits are layer information (Layer) indicating the layer of a plurality of recording layers or the layer structure of the disk.

The next 20 bits are a track address (track number) as an absolute address on the disk.

The next four bits represent the segment number. The value of the segment number is a value of "0" to "7" corresponding to segment 0 to segment 7, that is, this segment number is a value representing the circumferential position of the disk.

The next two bits are reserved, and for the last 14 bits of the wobbling address frame, an error-correction code (CRC) is formed.

As described above, in the wobbling address frame, fine clock marks are formed at even intervals.

Figure 5:
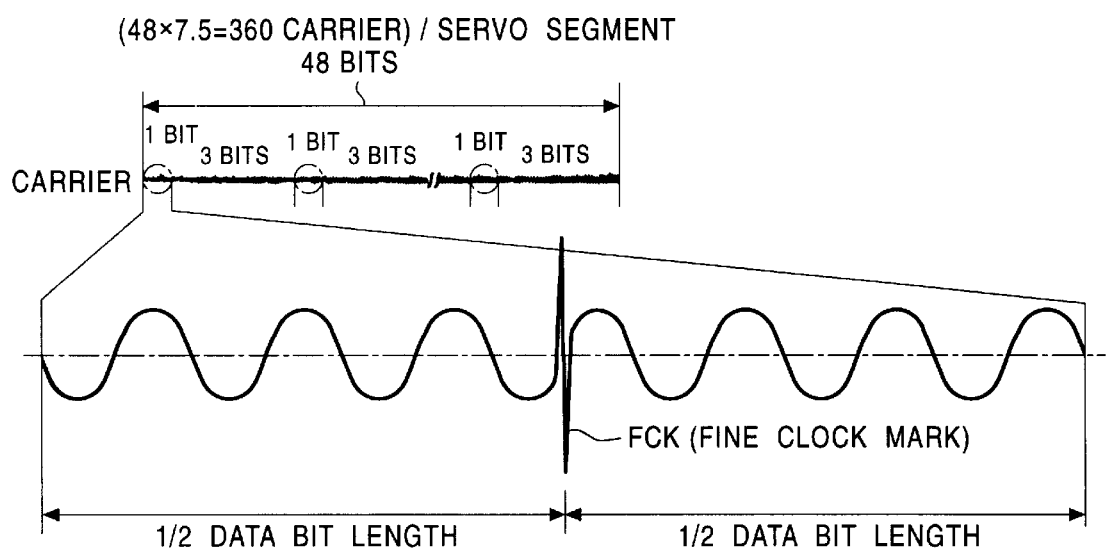
FIG. 5 is an illustration of a segment of a wobbling address of a disk according to the embodiment.

FIG. 5 shows a state of the fine clock mark. If 48-bit data is recorded in each wobbling address frame, and one bit is represented by seven waves (carriers) of a signal of a predetermined frequency as shown in FIG. 5, 360 waves are present in one frame.

If an optical disk 1 is rotated 1939 times per minute, the frequency of this carrier is 93.1 KHz.

As shown in FIG. 5, in the wobbling address frame shown in FIG. 4, for the fine clock marks, one bit is assigned every 4 bits of the address information, that is, the structure is such that 4 bits is a cycle and a fine clock mark is superposed onto one of these bits.

The first one bit in units of 4 bits is a bit containing a fine clock mark, and the remaining three bits are bits which do not contain a fine clock mark. The bit containing the fine clock mark is shown in enlarged view in the lower part of FIG. 5. As shown, a waveform as a fine clock mark FCK is contained at the central position of the data bit length.

In the meandering shape of the groove on the actual disk, the amount of wobble amplitude by the address data is, for example, about 12 nm. In a portion corresponding to this fine clock mark FCK, a wobble amplitude is momentarily increased to, for example, about 30 nm.

In this manner, in one frame, 12 fine clock marks are recorded every three bits. Therefore, in one rotation (one track), 96 (=12×8) fine clock marks are recorded.

This fine clock mark (a PLL clock generated from a fine clock mark in the recording and reproduction apparatus) is finer than the segment number, and can represent information indicating the position with respect to the circumferential direction, that is, the angle.

The frequency of a carrier of each 48-bit data is a value corresponding to each data. Each data, such as the track number, is biphase-modulated and then frequency-modulated, and the pregroove is wobbled by this frequency-modulated wave.

2. Cutting apparatus and disk to be formed

A method of cutting a disk having the above-described wobbling format will now be described.

The disk manufacturing process can be broadly classified into what is commonly called a master disk process (mastering process) and a formation-into-disk process (replication process). The master disk process is a process up to the completion of a metal master disk (stamper) used in the formation-into-disk process, and the formation-into-disk process is a process for, by using a stamper, mass-producing optical disks, which are replications thereof.

Specifically, in the master disk process, what is commonly called cutting is performed, such that a photoresist is coated onto a polished glass substrate, and pits and grooves are formed on this photosensitive film by exposure using a laser beam.

In the case of this example, pit cutting is performed in a portion corresponding to an embossed area of the disk, and also cutting of a wobbled groove is performed in a portion corresponding to a groove area.

Pit data in the embossed area is prepared in a preparation step called premastering.

When the cutting is finished, a predetermined process, such as development, is performed, and then, information is transferred onto the surface of a metal by, for example, electroforming, so that a stamper required for replicating disks is produced.

Next, using this stamper, information is transferred onto a resin substrate by, for example, an injection process, and a reflection film is produced thereon, and then a process, such as processing into a required disk shape, is performed, and a final product is completed.

Figure 6:
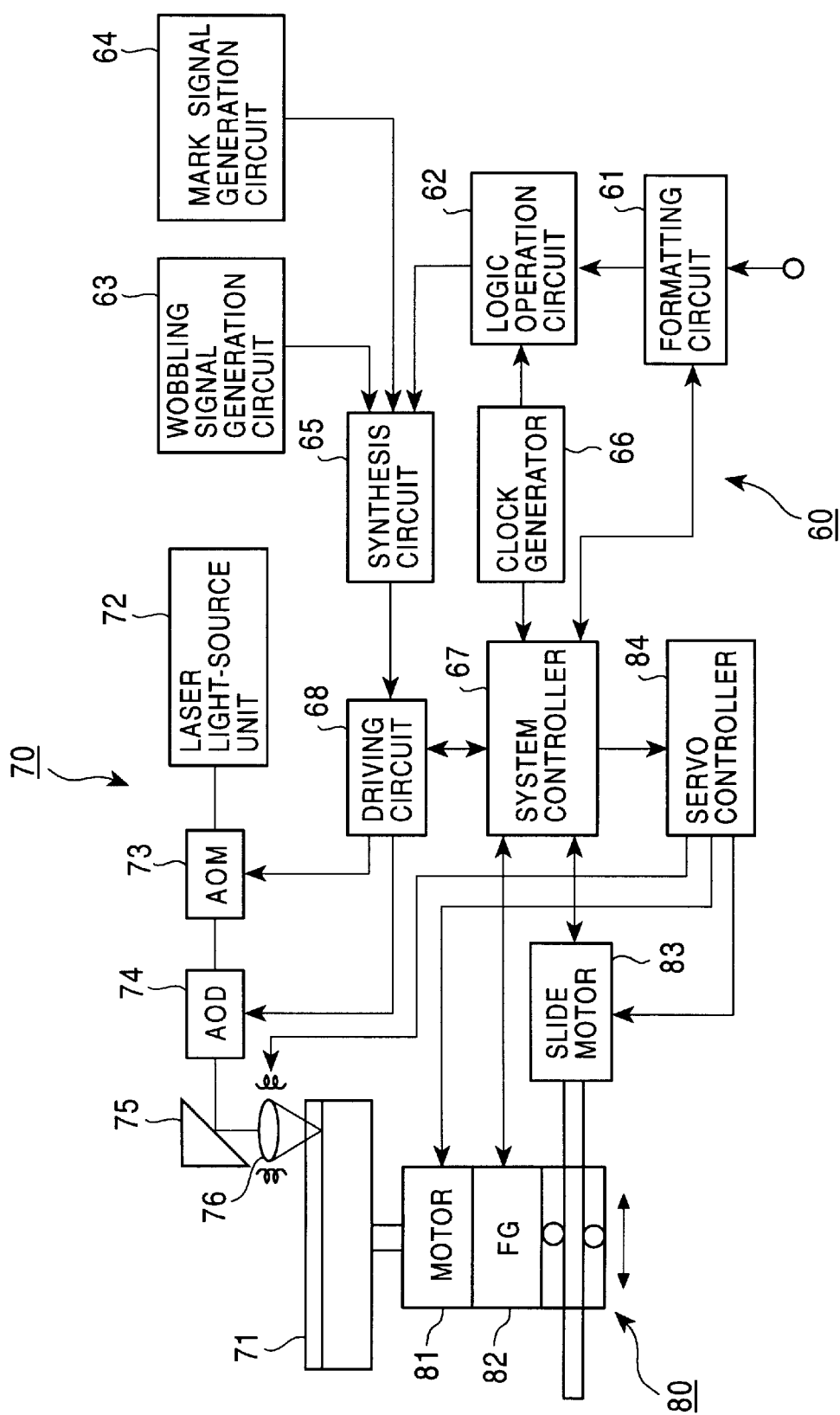
FIG. 6 is a block diagram of a cutting apparatus for manufacturing a disk according to the embodiment.

As shown, for example, in FIG. 6, the cutting apparatus comprises an optical section 70 for performing cutting by radiating a laser beam onto a glass substrate 71 formed with a photoresist, a driving section 80 for rotationally driving the glass substrate 71, and a signal processing section 60 for controlling the optical section 70 and the driving section 80.

The optical section 70 includes a laser light-source unit 72 formed of, for example, a He—Cd laser, an acoustooptic-type light modulator 73 (AOM) for modulating (on/off) light emitted from the laser light-source unit 72 in accordance with recording data, an acoustooptic-type light deflector 74 (AOD) for deflecting light emitted from the laser light-source unit 72 in accordance with a wobbling signal, a prism 75 for bending the optical axis of the modulation beam from the light deflector 74, and an objective lens 76 for collecting a modulation beam reflected by the prism 75 and radiating it onto the photoresist surface of the glass substrate 71.

The driving section 80 comprises a motor 81 for rotationally driving the glass substrate 71, an FG 82 for generating an FG pulse for detecting the rotational speed of the motor 81, a slide motor 83 for sliding the glass substrate 71 along the direction of its radius, and a servo controller 84 for controlling the rotational speed of the motor 81 and the slide motor 83, tracking of the objective lens 76, and so on.

Furthermore, the signal processing section 60 comprises a formatting circuit 61 for forming input data by adding, for example, an error-correction code and the like to source data from, for example, a computer, a logic operation circuit 62 for performing a predetermined operation process on input data from the formatting circuit 61 and for forming recording data, a wobbling signal generation circuit 63 for generating a wobble signal for wobbling a groove, a mark signal generation circuit 64 for generating a signal for forming a fine clock mark, a synthesis circuit 65, a driving circuit 68 for driving the light modulator 73 and the light deflector 74 in accordance with a signal from the synthesis circuit 65, a clock generator 66 for supplying a clock to the logic operation circuit 62 and the like, and a system controller 67 for controlling the servo controller 84 and the like.

In this cutting apparatus, during cutting, while the servo controller 84 causes the motor 81 to rotationally drive the glass substrate 71 at a constant angular speed and causes the slide motor 83 to rotate the glass substrate 71, this is made to slide so that tracks in a spiral shape are formed at a predetermined track pitch.

At the same time, the light emitted from the laser light-source unit 72 is formed into a modulation beam based on recording data through the light modulator 73 and the light deflector 74 and is radiated from the objective lens 76 onto the surface of the photoresist of the glass substrate 71, and as a result, the photoresist surface is photosensitized in accordance with data and the groove.

Meanwhile, the input data to which an error-correction code and the like is added by the formatting circuit 61, that is, data, such as control data, to be recorded in an embossed area is supplied to the logic operation circuit 62 and formed as recording data.

At the cutting timing of the embossed area, this recording data is supplied to the driving circuit 68 via the synthesis circuit 65, the driving circuit 68 controls the light modulator 73 so that it is turned on at a bit timing at which a pit should be formed in accordance with recording data, and drivingly controls the light modulator 73 so that it is turned off at a bit timing at which a pit is not formed.

At the groove area cutting timing, the synthesis circuit 65 synthesizes a fine clock mark signal output from the mark signal generation circuit 64 with an address modulation signal output from the wobbling signal generation circuit 63, that is, a signal such that an absolute address is FM-modulated, thereby generating a wobbling signal for forming wobbles, and supplies it to the driving circuit 68. The driving circuit 68 controls the light modulator 73 so that it is turned on continuously in order to form a groove, and drives the light deflector 74 in accordance with a wobbling signal. As a result, the laser light is made to meander, that is, a part exposed as a groove is wobbled.

With such an operation, an exposed portion corresponding to a groove/embossed pit is formed on a glass substrate 71 in accordance with a format.

Thereafter, development, electroforming, and the like are performed to produce a stamper, and the above-described disk is produced by using the stamper.

In the cutting apparatus of this example, the fine clock mark signal output from the mark signal generation circuit 64 has a frequency higher than that of an address modulation signal, and is formed into a waveform such that the differential value near the leading portion and the trailing portion of the waveform is a value smaller than that of a rectangular wave.

Specifically, as shown in FIG. 7(a), this fine clock mark signal is a signal having a waveform such that both end portions of the waveform are almost linear, in which level variations are moderate, and the center of the waveform has sharp level variations.

In the case of a conventional cutting apparatus, a fine clock mark signal is a rectangular wave such as that shown in FIG. 2(a).

The fine clock mark signal in this example as in FIG. 7(a) is synthesized with the address modulation signal by the synthesis circuit 65, is formed into a wobble signal such as that of FIG. 7(b), and is output to the driving circuit 68 as described above.

On the disk of this example produced from a master disk formed by such a cutting apparatus, a groove is formed as in FIG. 7(c).

The wobbled track of this FIG. 7(c) is shown in a greatly deformed state for convenience of description, and in practice, it is not formed into as sharp a meandering shape as this. As described in this figure, a groove as a track is made to meander in accordance with the amplitude of a wobble signal, that is, an address modulation signal and a fine clock mark signal.

The wobbled portion as a fine clock mark is formed at a position corresponding to the starting one bit of every four bits in 48 bits as an address frame as described above.

In the disk of this example, since the address frame is represented in a groove shape as data in response to CAV rotation, the wobbled portion as a fine clock mark appears at predetermined angular intervals on one circular track of the disk, thereby, as described above, the fine clock mark becomes circumferential positional information in units finer than the segment number.

In the case of a disk such that an address frame is srepresented as data in response to CLV rotation, an example is conceivable in which the wobbled portion as a fine clock mark appears at every predetermined distance (track line distance) on one circular track of the disk.

3. Recording and reproduction apparatus

Figure 8:
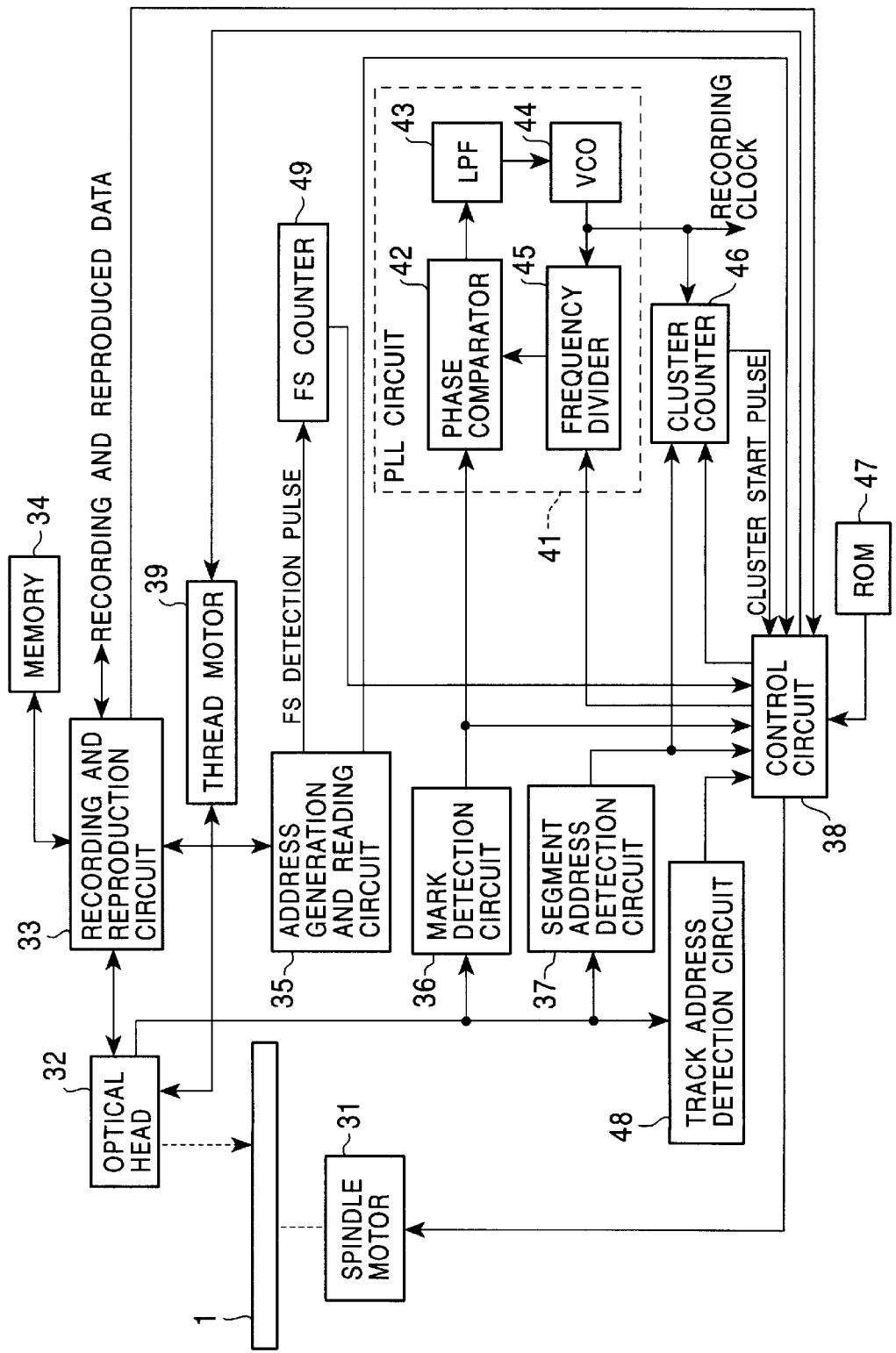
FIG. 8 is a block diagram of a recording and reproduction apparatus for which a disk according to the embodiment is adapted.

FIG. 8 shows an example of the construction of an optical-disk recording and reproduction apparatus for recording or reproducing data onto or from the disk 1 that has been described.

A spindle motor 31 causes the disk 1 to rotate at a predetermined speed, that is, performs CAV rotation driving.

The optical head 32 radiates laser light onto the disk 1, records data onto the disk 1, and reproduces data from the reflected light.

The recording and reproduction circuit 33 causes recording data input from an unillustrated external apparatus (e.g., a host computer) to be recorded once in a memory 34. When data in an amount for one cluster as a recording unit is recorded in the memory 34, this data for one cluster is read, and recording data is generated by performing encoding, such as interleave, addition of an error-correction code, and 8–16 modulation. Then, the recording and reproduction circuit 33 outputs the recording data to the optical head 32 and causes it to perform a recording operation for the disk 1.

Also, during reproduction, the recording and reproduction circuit 33 performs decoding, such as 8–16 demodulation, an error-correction process, and deinterleave, and outputs the decoded data into an apparatus (not shown).

During recording, the address generation and reading circuit 35 generates an address (this is not an address recorded as wobbling information) which is recorded within the track (pregoove 2) in response to the control from the control circuit 38 formed of, for example, a microcomputer, and outputs it to the recording and reproduction circuit 33.

The recording and reproduction circuit 33 adds this address to the recording data, and outputs it to the optical head 32 by which it is recorded as address data.

Also, when address data is contained in the reproduction data reproduced from the track of the disk 1, the recording and reproduction circuit 33 separates this and outputs it to the address generation and reading circuit 35. The address generation and reading circuit 35 outputs the read address to the control circuit 38.

Furthermore, the address generation and reading circuit 35 detects a frame synchronization signal FS (frame sync) in the data and outputs the detection result to the frame sync (FS) counter 49. The FS counter 49 counts the FS detection pulse output from the address generation and reading circuit 35 and outputs the count value to the control circuit 38.

The mark detection circuit 36 detects a component (zero-cross edge signal ZCED to be described later) corresponding to a fine clock mark from the RF signal (signal FCM based on the wobbling shown in FIG. 7(d)) reproduced and output by the optical head 32. Also, the mark detection circuit 36 determines the cycle of the detected pulse as a fine clock mark detection signal. That is, since the fine clock mark is generated at a fixed cycle (every four bits), a determination is made of whether the zero-cross edge signal ZCED is a detection pulse generated at this fixed cycle. When it is a detection pulse generated at a fixed cycle, it is output as a correct fine clock mark detection signal to the phase comparator 42 of the PLL circuit 41 at a later stage.

When a detection pulse is not input at a fixed cycle, the mark detection circuit 36 generates a pseudo-pulse at a predetermined timing so that the PLL circuit 41 at a later stage is not locked to a wrong phase.

The detection signal of the mark detection circuit 36 is also supplied to the control circuit 38. The construction and operation of the mark detection circuit 36 will be described later in detail.

The segment address detection circuit 37 and the track address detection circuit 48 detect a segment number and a track number from the wobbling signal output from the optical head 32, respectively. As described with reference to FIG. 4, a track number (track address) and a segment number (circumferential position information) are recorded in the 48-bit wobbling address frame. These are detected by the track address detection circuit 48 and the segment address detection circuit 37, and supplied to the control circuit 38.

The detected track address is also supplied to the cluster counter 46.

The PLL circuit 41 comprises, in addition to the phase comparator 42, a low-pass filter 43, a voltage-controlled oscillator (VCO) 44, and a frequency divider 45.

The phase comparator 42 compares an input from the mark detection circuit 36 with an input from the frequency divider 45, and outputs the phase difference. The low-pass filter 43 compensates for the phase of the phase difference signal output from the phase comparator 42 and outputs it to the VCO 44. The VCO 44 generates a clock of a phase corresponding to the output of the low-pass filter 43, and outputs it to the frequency divider 45. The frequency divider 45 frequency-divides the clock input from the VCO 44 by a predetermined value and outputs the frequency-divided result to the phase comparator 42.

Also, the clock output from the VCO 44 is supplied as a recording clock to a required circuit and is also supplied to the cluster counter 46. The cluster counter 46 counts the number of clocks output from the VCO 44 by using the track address in the wobbling signal supplied from the track address detection circuit 48 as a reference, and when the count value reaches a preset predetermined value (value corresponding to the length of one cluster), generates a cluster start pulse and outputs it to the control circuit 38.

The thread motor 39 is controlled by the control circuit 38 so that the optical head 32 is moved to a predetermined track position of the disk 1. Also, the control circuit 38 controls the spindle motor 31 so that the disk 1 is rotated at a predetermined speed.

In the ROM 47, a table which defines the corresponding relationship between a track number within the address frame and zones such that the data recording area of the disk 1 is divided, and, as required, a table which defines the relationship between zones and bands to which the zones correspond, are stored. Although a detailed description of the zoning format of this example is avoided, the control circuit 38 controls each section so that a recording and reproduction operation corresponding to a zoning format is performed.

More specifically, when a point to be accessed is obtained in the form of a sector number, the control circuit 38 performs a process for replacing this sector number with a track number and a data frame number in that track. For this purpose, in the ROM 47, a table showing the corresponding relationship of a track number with a zone number, an ECC block number, the number of frames per zone, a track number, the number of frames per track, and the like is stored. By referring to this table, the control circuit 38 reads a track number corresponding to the specified sector number and the number of data frames in the track.

Meanwhile, the control circuit 38 detects a track number, that is, the current track address detected from the wobbling signal, from the output of the track address detection circuit 48.

After a desired (access object) track number is detected by the track address detection circuit 48, the control circuit 38 detects the reference position of that track.

On the disk 1, a track number is recorded as wobbling information, and in the address frame of each track, a clock synchronization mark is recorded at a cycle of 4 bits. The control circuit 38 detects, as a reference fine clock mark, the fine clock mark inserted in the first bit of 48 bits of the first address frame (address frame of segment number 0) of a predetermined track.

Furthermore, when one reference fine clock mark is detected for one circular track, the control circuit 38 resets the count value of the FS counter 49. Thereafter, when a frame synchronization signal is detected, the FS counter 49 counts this.

When the count value of the FS counter 49 reaches a value corresponding to the sector number to be retrieved, the sector is determined to be a sector to be retrieved.

Then, when starting recording in a predetermined sector, the control circuit 38 performs control so that the recording start position of the recording of the sector is in a range of (0 to 2)±4 bytes from the zero-cross timing of the fine clock mark used as a reference.

In the manner described above, it is possible for the control circuit 38 to perform control for accessing any desired position (any desired position in one rotation) on the track on the basis of the count value of the recording clock by using a clock synchronization mark, which is detected firstly, of the frame (address frame) of, for example, frame number 0.

That is, access can be made in track and data frame units.

In the manner described above, when an access to an arbitrary position on the track is made, it is required further that a determination of which zone the access position belongs to be made, and a clock of a frequency corresponding to the zone be generated in the VCO 44.

Therefore, the control circuit 38 determines whether the read track number indicates a new zone different from the zone which has been accessed thus far. When it is a new zone, the control circuit 38 controls the frequency divider 45 so that a frequency-division ratio corresponding to the new zone is set. As a result, a recording clock of a frequency different for each zone is output from the VCO 44.

4. Fine clock mark detection operation

In order to accurately perform a control operation for recording and reproduction such as that described above, it is necessary to accurately detect a fine clock mark represented by wobbles on the disk 1.

Figure 9:
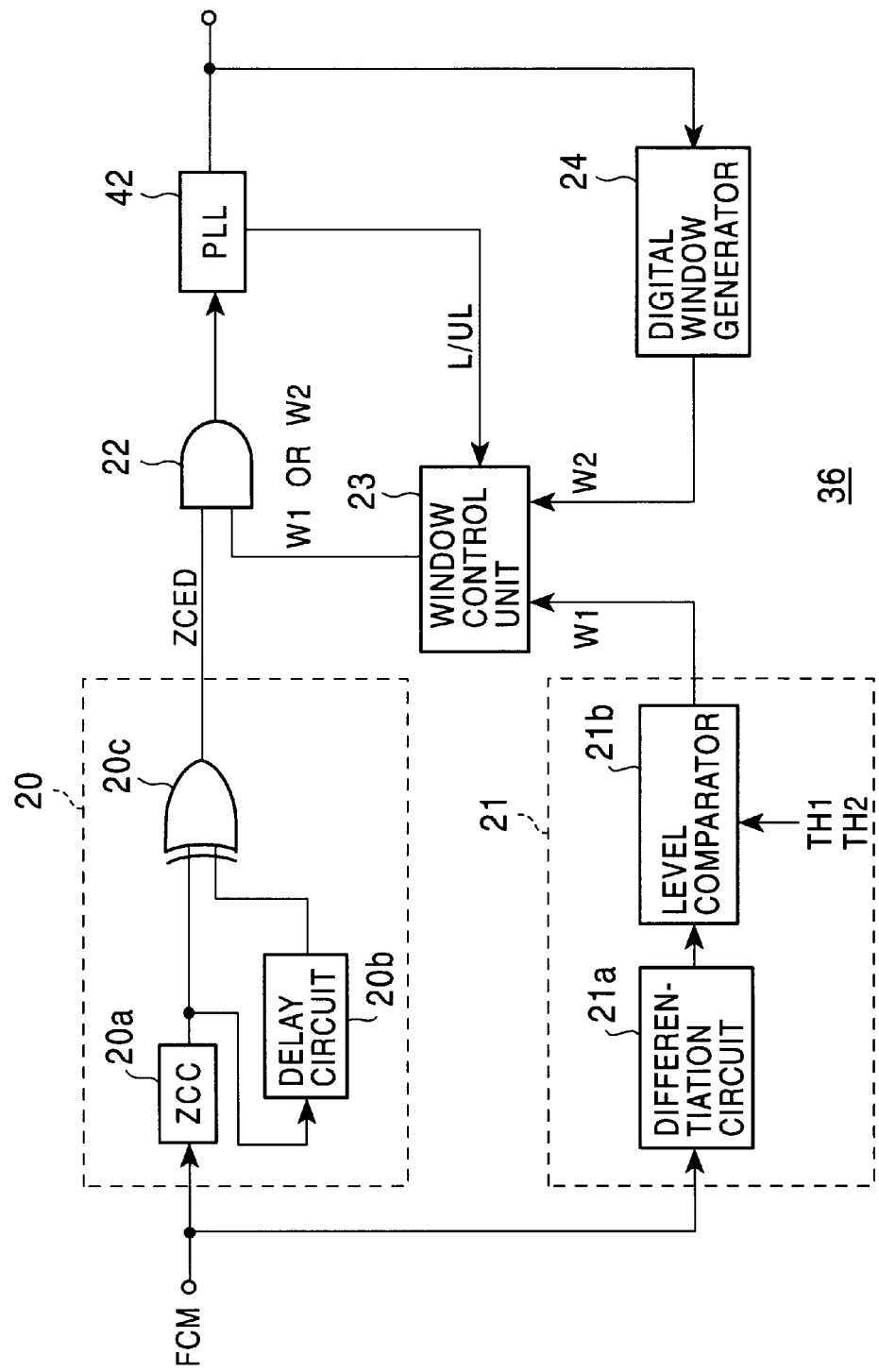
FIG. 9 is a block diagram of a mark detection circuit of a recording and reproduction apparatus for which a disk according to the embodiment is adapted.

The mark detection circuit 36 for detecting a fine clock mark is constructed as in FIG. 9, for example.

As shown, the mark detection circuit 36 includes a zero-cross edge detection section 20, an analog window detection circuit 21, an AND gate 22, a window control unit 23, and a digital window generator 24.

Figure 7:
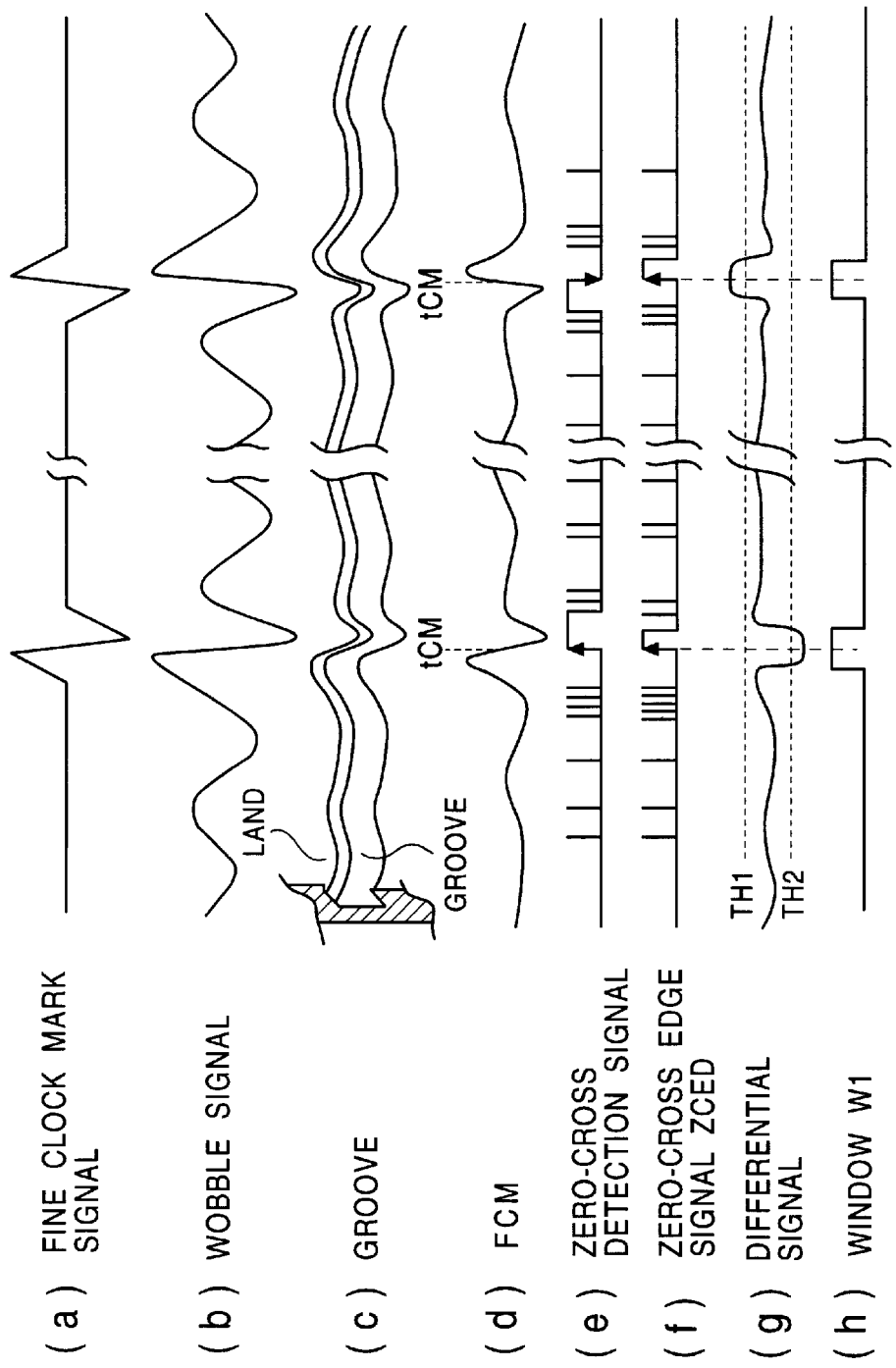
FIG. 7 is an illustration of a wobble production and detection operation by a fine clock mark according to an embodiment of the present invention.

The signal FCM, based on wobbling, output from the optical head 32 has a signal waveform corresponding to a wobble as a fine clock mark as in FIG. 7(*d*), for example.

As a result of this signal FCM being supplied to a zero-cross comparator 20*a* in the zero-cross edge detection section 20 and a zero cross being detected, a zero-cross detection signal such as that in FIG. 7(*e*) is obtained.

This zero-cross detection signal is supplied to one of the input terminals of an EX-OR gate 20*c* as it is, is delayed by a delay circuit 20*b*, and is supplied to the other terminal of the EX-OR gate 20*c*. Therefore, the output of the EX-OR gate becomes a zero-cross edge signal ZCED as in FIG. 7(*f*).

Meanwhile, the signal FCM is differentiated by a differentiation circuit 21*a* in the analog window detection circuit 21, and a differential signal as in FIG. 7(*g*) is obtained.

As a result of this differential signal being sliced in accordance with predetermined threshold values TH1 and TH2 by the level comparator 21*b*, a window w1 such as that shown in FIG. 7(*h*) is generated.

When the PLL circuit 41 is in an unlocked state, the window control unit 23 causes the window w1 from the analog window detection circuit 21 to be supplied to the AND gate 22.

As can be seen from FIG. 7, the zero-cross edge signal ZCED extracted (output from the AND gate 22) in the period of the window w1 becomes a pulse corresponding to the fine clock timing tCM.

The PLL circuit 41 performs a lock operation on this pulse, thereby obtaining a clock which is synchronized with the fine clock mark.

The clock from the PLL circuit 41 is also supplied to the digital window generator 24, and the digital window generator 24 generates a window w2 in accordance with a clock count.

This window w2 is a window having the same period as that of the window w1. During the period in which the PLL circuit 41 is locked, the window control 23 supplies the window w2 to the AND gate 22.

That is, during the period in which the PLL circuit 41 is locked, since a window can be generated accurately by the clock count, the window w2 having high reliability by the digital window generator 24 is supplied to a processing in the AND gate 22.

In this example, however, the window w1, which is an output of the analog window detection circuit unit 21, also becomes a window having high reliability.

As described above, the wobbled portion corresponding to a fine clock mark is formed by a signal of a waveform such that both end portions of the waveform are almost linear, in which level variations are moderate, and the center of the waveform has sharp level variations, as shown in FIG. 7(*a*), in a waveform such that the differential value near the leading portion and the trailing portion of the waveform is a value smaller than that of a rectangular wave. Therefore, also for the signal FCM, the waveform of a portion corresponding to the fine clock mark becomes such that the differential value near the leading portion and the trailing portion thereof is a small value. As can be seen clearly by comparing with the differential signal described in FIG. 2(*f*), in the case of this example, a very large amplitude does not appear near the leading portion and the trailing portion of the fine clock mark in the differential signal, as in FIG. 7(*g*).

Therefore, the window w1 generated by the slice; processing in the level comparator 21*b* becomes a window which can be masked satisfactorily also near the leading portion and the trailing portion of the fine clock mark. As a result, as an output of the AND gate 22, this becomes a signal such that the fine clock mark timing tCM is detected correctly.

That is, when a recording and reproduction operation is performed onto the disk 1 of this disk 1, the recording and reproduction apparatus is able to generate accurately a clock synchronized with the fine clock mark and can accurately perform various processing based on this clock. In other words, the reliability of the recording and reproduction operation with respect to the disk 1 can be improved.

Although in the foregoing the disk of this embodiment and the cutting apparatus are described, and the operation of the recording and reproduction apparatus has also been described, the present invention is not limited to these examples. In particular, in order to generate a fine clock mark, various waveforms of a fine clock mark signal output from the mark signal generation circuit 64 of the cutting apparatus, and various wobble shapes on the disk 1 corresponding thereto, are conceivable. In any case, any shape may be adopted as long as the differential value of a waveform is small in both end portions of the waveform.

The numerical values described as a format are examples, and it is a matter of course that various changes are possible.

As has been described, in the present invention, a track is wobbled in accordance with a synchronization mark signal which has a waveform such that the differential value near the leading portion and the trailing portion of the waveform is a value smaller than that of a rectangular wave, thereby wobbled portions corresponding to the synchronization marks are formed. For example, a synchronization mark signal is a signal having a waveform such that both end portions of the waveform are almost linear, in which level variations are moderate, and the center of the waveform has sharp level variations. As a result, the wobbled portion on a recording medium have a wobbled shape such that the differential value of the information reproduced from the wobbled portion increases in the center of the wobbled portion, and such that the differential value decreases sufficiently in a portion other than the center of the wobbled portion.

Therefore, the amplitude of the differential signal does not become large in an unwanted portion when information reproduced from the wobbled portion is differentiated, and by slicing the differential signal at a predetermined level, it is possible to generate a window most appropriate for detection of a synchronization mark signal, and the synchronization mark signal can be detected correctly. Therefore, in the case where a recording and reproduction operation is performed with respect to an optical recording medium of the present invention produced by the manufacturing method of the present invention, the recording and reproduction apparatus is able to accurately generate a clock synchronized with a synchronization mark, and there is the advantage that the reliability of the recording and reproduction operation can be improved.

In the address information, synchronization marks are contained at predetermined intervals, and the wobbled portions of the synchronization marks are placed so as to have predetermined distance intervals or predetermined angular intervals on a track wobbled in accordance with the address modulation signal. Thus, a clock synchronized with the synchronization mark can be used as more accurate position information on a recording medium.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An optical recording medium in which a track for recording data is formed in advance, this track being wobbled in accordance with an address modulation signal such that a carrier having a predetermined frequency is frequency-modulated in such a manner as to accord with address information, wherein said address information contains a plurality of synchronization marks, and said synchronization marks are recorded in such a way that said track is wobbled in accordance with a synchronization mark signal which has a frequency higher than that of said address modulation signal, and which has a waveform whose differential value near the leading portion and the trailing portion of the waveform is a value smaller than that of a rectangular wave.

2. An optical recording medium according to claim 1, wherein said address information is such that said synchronization marks are placed at predetermined intervals, wobbled portions of said synchronization marks being placed so as to have predetermined distance intervals or predetermined angular intervals on a track wobbled in accordance with said address modulation signal.

3. An optical recording medium according to claim 1, wherein the wobbled portion of said synchronization mark is formed into a wobbled shape such that the differential value of the information reproduced from the wobbled portion increases in the center of the wobbled portion and decreases sufficiently in a portion other than the center of the wobbled portion.

4. A method for manufacturing an optical recording medium in which a track for recording data is formed in advance, said method comprising the steps of:

generating an address modulation signal such that a carrier having a predetermined frequency is frequency-modulated in accordance with address information;

generating a synchronization mark signal which accords with a plurality of synchronization marks contained in said address information, which has a frequency higher than that of said address modulation signal, and which has a waveform whose differential value near the leading portion and the trailing portion of the waveform is a value smaller than that of a rectangular wave;

generating a wobbling signal by synthesizing said address modulation signal with said synchronization mark signal; and forming a wobbled track in accordance with said wobbling signal.

5. A method according to claim 4, wherein said synchronization mark signal is a signal having a waveform such that both ends of the waveform are almost linear, in which level variations are moderate, and the center of the waveform has sharp level variations.

6. A method according to claim 4, wherein in said formation step, laser light from a laser light-source unit is radiated onto a photoresist surface of a substrate while the laser light is being deflected.

* * * * *